US011124859B2

(12) United States Patent
Chung et al.

(10) Patent No.: US 11,124,859 B2
(45) Date of Patent: Sep. 21, 2021

(54) LITHIUM ADSORPTION-DESORPTION APPARATUS AND LITHIUM ADSORPTION-DESORPTION METHOD USING THE SAME

(71) Applicant: Korea Institute Of Geoscience And Mineral Resources, Daejeon (KR)

(72) Inventors: Kang-Sup Chung, Daejeon (KR); Byoung-Gyu Kim, Daejeon (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 246 days.

(21) Appl. No.: 16/503,698

(22) Filed: Jul. 5, 2019

(65) Prior Publication Data

US 2020/0010927 A1    Jan. 9, 2020

(30) Foreign Application Priority Data

Jul. 6, 2018    (KR) .................. 10-2018-0078783

(51) Int. Cl.
*C22B 26/12* (2006.01)
*B01D 15/00* (2006.01)
(Continued)

(52) U.S. Cl.
CPC .............. *C22B 26/12* (2013.01); *B01D 15/00* (2013.01); *B01J 23/34* (2013.01); *C02F 1/281* (2013.01);
(Continued)

(58) Field of Classification Search
CPC ......... C22B 7/006; C22B 26/12; B01D 15/00; B01D 15/02; B01J 20/0222; B01J 23/34;
(Continued)

(56) References Cited

U.S. PATENT DOCUMENTS

| 5,200,074 A * | 4/1993 | Suzuki ................. B01D 15/02 |
| | | 210/267 |
| 2011/0297607 A1* | 12/2011 | Pei ........................ C02F 1/288 |
| | | 210/236 |
| 2016/0214869 A1* | 7/2016 | Chung ..................... C22B 3/24 |

FOREIGN PATENT DOCUMENTS

| CN | 102906287 A | 1/2013 |
| CN | 105645692 A | 6/2016 |
| | (Continued) | |

OTHER PUBLICATIONS

Chinese Office Action dated Aug. 2, 2021 issued in corresponding Chinese Appln. No. 201910605715.2.

*Primary Examiner* — Matthew O Savage
(74) *Attorney, Agent, or Firm* — Harness, Dickey & Pierce, P.L.C.

(57) ABSTRACT

The invention relates to a lithium adsorption-desorption apparatus including a plurality of reaction tanks arranged in a row; a guide rail disposed at an upper portion of the reaction tank; a movable driving unit coupled to a moving means that moves along the guide rail; and a reaction housing which is mounted to the driving unit, and can be vertically moved or rotated in a state in which the lithium adsorbent is fixed thereto, and after immersing in the reaction tank, accelerates adsorption or desorption of lithium, and after being lifted, discharges residual solution from the lithium adsorbent by rotation movement.
Therefore, the lithium adsorption desorption apparatus can fix a large amount of lithium adsorbent and immerse it in a lithium-containing solution to effectively adsorb lithium and then quickly desorb lithium in a desorption solution, and can efficiently wash the lithium adsorbent in a cleaning solution.

16 Claims, 5 Drawing Sheets

(51) Int. Cl.
*C02F 1/28* (2006.01)
*C22B 7/00* (2006.01)
*B01J 23/34* (2006.01)
*C02F 103/08* (2006.01)
*C02F 101/10* (2006.01)
*C02F 101/20* (2006.01)
*B01J 20/02* (2006.01)

(52) U.S. Cl.
CPC ........... *C22B 7/006* (2013.01); *B01J 20/0222* (2013.01); *C02F 1/288* (2013.01); *C02F 2101/10* (2013.01); *C02F 2101/20* (2013.01); *C02F 2103/08* (2013.01); *C02F 2303/16* (2013.01)

(58) Field of Classification Search
CPC .. C02F 1/28; C02F 1/281; C02F 1/288; C02F 2103/08; C02F 2101/10; C02F 2101/20; C02F 2303/16
USPC ............... 423/179.5; 210/272, 675, 676, 688
See application file for complete search history.

(56) References Cited

FOREIGN PATENT DOCUMENTS

| | | |
|---|---|---|
| CN | 107949541 A | 4/2018 |
| CN | 207391225 U | 5/2018 |
| JP | 2001089820 A | 4/2001 |
| JP | 2002-167628 A | 6/2002 |
| KR | 100557824 B1 | 3/2006 |
| KR | 20070102870 A | 10/2007 |
| KR | 101383299 B1 | 4/2014 |
| KR | 101639755 B1 | 7/2016 |

* cited by examiner

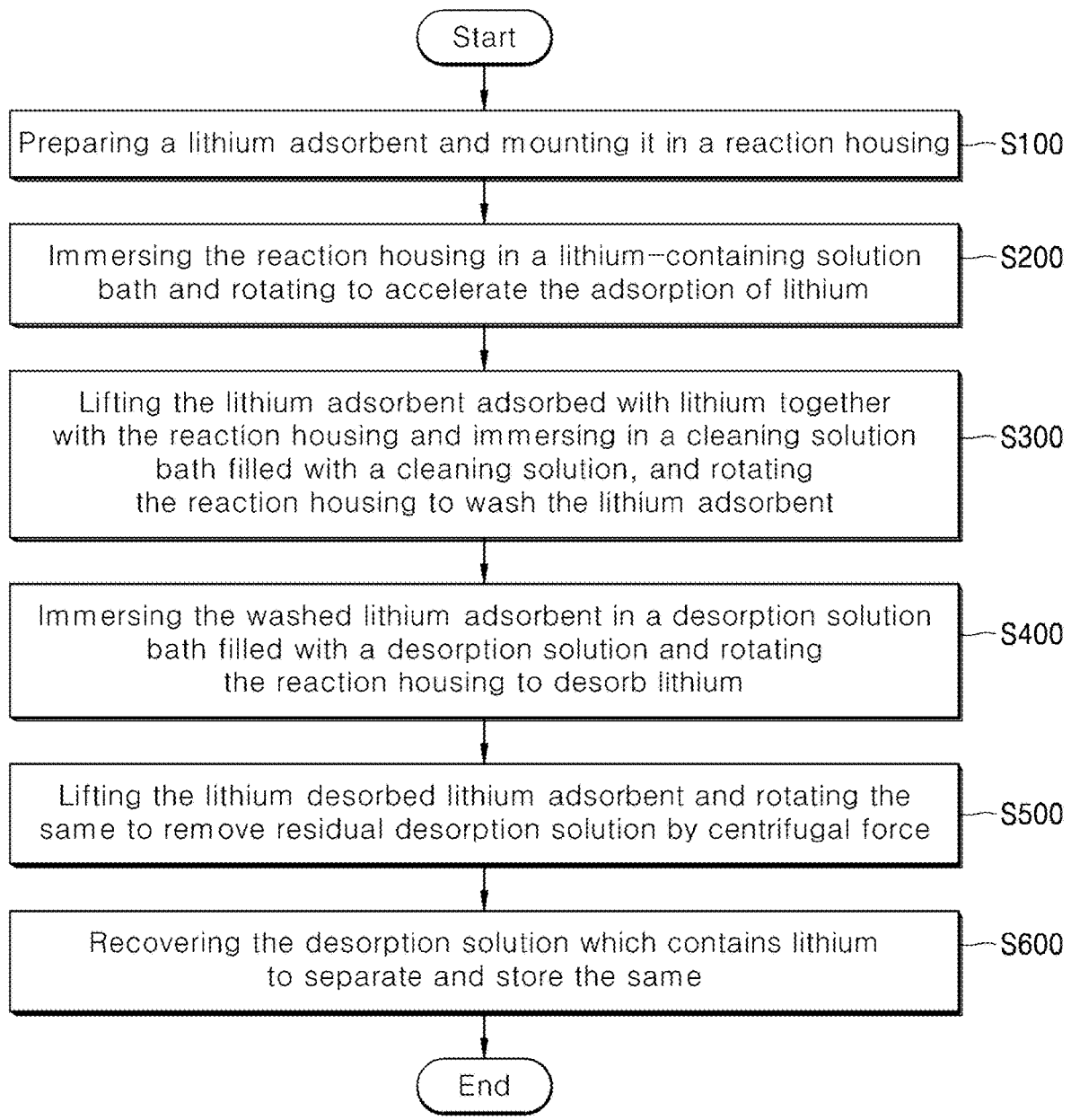

LITHIUM ADSORPTION-DESORPTION APPARATUS AND LITHIUM ADSORPTION-DESORPTION METHOD USING THE SAME

CROSS-REFERENCE TO RELATED APPLICATION

This application claims priority to Korean Patent Application No. 10-2018-0078783 filed on Jul. 6, 2018, and all the benefits accruing therefrom under 35 U.S.C. § 119, the contents of which is incorporated by reference in its entirety.

BACKGROUND OF THE INVENTION

1. Field of the Invention

The present invention relates to a lithium adsorption-desorption apparatus and a lithium adsorption-desorption method using the same, and more particularly to a lithium adsorption-desorption apparatus for more efficiently adsorbing or desorbing lithium by using a lithium adsorbent, and a lithium adsorption-desorption method using the same.

2. Description of the Related Art

Lithium is a rare non-ferrous metal widely used in secondary batteries, special glass, oxide single crystals, aviation, spring materials, and the like. In particular, in recent years, with the development of mobile phones, notebook computers, and electric vehicle industries, a large number of secondary batteries are being required, and thus lithium consumption is continuing to increase.

Lithium exists in the form of a salt in its natural state, and 70% or more of its total reserves are distributed mainly in salt lakes, rock salt, and the like, and are usually recovered in the form of lithium carbonate.

However, due to the imbalance of lithium producing countries, the output is not constant, so it is difficult to ensure stable lithium, and ensuring stable lithium is becoming a necessary condition for industrial development.

Seawater is favored as a resource that can largely ensure lithium. It is reported that about 230 billion tons of lithium are dissolved in seawater.

However, since the concentration of lithium contained in seawater is very low, as low as 0.17 mg per liter of seawater, it is difficult to improve the economic efficiency of lithium ion recovery.

In order to recover lithium ions from seawater, methods such as ion exchange adsorption, solvent extraction, and co-precipitation have been studied. Among these attempts, the lithium ion recovering method using a manganese oxide-based inorganic adsorbent having ion exchange characteristics with extremely high selectivity is one of the most preferable methods.

To this end, various manganese oxide-based inorganic adsorbents are being developed.

The manganese oxide-based inorganic adsorbent is prepared in an ion-sieve form, wherein a lithium ion-hole is formed by topo-tactic extraction of lithium through an acid treatment process after preparing a lithium manganese oxide. Therefore, it has the advantage of high selectivity.

In order to apply the above manganese oxide-based inorganic adsorbent to an actual sea area or a solution containing lithium ions, a forming process is required. To this end, a lithium adsorbent that can effectively adsorb lithium is disclosed (Patent document 1), wherein the lithium adsorbent is molded after mixing lithium manganese oxide powder with a binder and then immersing a urethane foaming agent.

However, in the case of a lithium adsorbent molded in a predetermined form, it is necessary to immerse a large amount in a lithium-containing solution to adsorb lithium, and there is a great need for an apparatus that uses a desorption solution to desorb lithium for lithium recovery after lithium is adsorbed and effectively removes the large amount of residual desorbed solution in the adsorbent during the desorption process to increase the efficiency of the lithium recovery process.

As a prior art, there is Korean Granted Patent No. 10-0557824.

SUMMARY OF THE INVENTION

Therefore, the present invention is directed to provide a lithium adsorption-desorption apparatus and a lithium adsorption-desorption method using the same, which improves lithium recovery efficiency by, adsorbing lithium by using a porous lithium adsorbent molded in a predetermined form, and then efficiently cleaning the adsorbent to remove contaminants other than lithium from the lithium adsorbent and immersing it in a desorption solution to rapidly desorb lithium, and concentrating the desorption solution.

The problem to be solved by the present invention is not limited to the above-mentioned problem(s), and from the following description, other problem(s) not mentioned will be understood by those skilled in the art to which the present invention pertains.

In order to solve the above problems, according to an embodiment of the present invention, a lithium adsorption-desorption apparatus is provided, and the lithium adsorption desorption apparatus includes:

a plurality of reaction tanks arranged in a row;

a guide rail disposed at an upper portion of the reaction tank;

a movable driving unit coupled to a moving means that moves along the guide rail; and a reaction housing which is mounted to the driving unit, and can be vertically moved or rotated in a state in which the lithium adsorbent is fixed thereto, and after immersing in the reaction tank, accelerates adsorption or desorption of lithium, and after being lifted, discharges residual solution from the lithium adsorbent by rotation movement.

Further, the driving unit may include, a chain coupled to the moving means;

a base plate which is connected to a chain to be vertically movable and is provided with a motor;

an actuator which is disposed on one side of the base plate and vertically moves the motor; and a drive shaft which is coupled to the motor to rotate the reaction housing.

According to another embodiment of the present invention, the present invention provides a lithium adsorption-desorption apparatus including:

a lithium supply portion where a lithium solution tank filled with a lithium-containing solution is disposed;

a reaction portion which is disposed on one side of the lithium supply portion, and is provided with a plurality of cleaning baths and desorption baths therein;

a guide rail placed on a plurality of frames extending from an edge of the lithium supply portion and the reaction portion;

a driving unit coupled to a moving means that is movable along the guide rail;

a reaction housing which is mounted to the driving unit, and can be vertically moved or rotated in a state in which a lithium adsorbent is fixed, such that after being immersed in the lithium solution tank to adsorb lithium or after being immersed and agitated in the cleaning bath or desorption bath to wash the lithium adsorbent or desorb lithium, respectively, is lifted vertically to discharge residual solution from the lithium adsorbent by centrifugal force generated by the rotation; and a control unit disposed on one side of the reaction portion to control movement of the moving means and the driving unit.

Further, the lithium-containing solution may be one selected from the group consisting of seawater, brine, geothermal water, lithium waste solution and the like.

Further, the plurality of cleaning baths and desorption baths may be arranged such that the cleaning baths filled with cleaning solution and desorption baths filled with an acidic aqueous solution are alternately arranged in a row.

Further, the desorption bath may be provided with a lithium concentration tank on one side, which receives and stores a desorption solution concentrated by lithium desorption.

Further, the guide rail may be spaced apart from the upper portion of the lithium supply portion and the reaction portion so that the driving unit coupled to the moving means is located at an upper portion of the lithium solution tank, the cleaning bath, or the desorption bath.

Further, the driving unit may include, a base plate attached to the upper portion of the cleaning bath or the desorption bath to prevent the cleaning solution or the desorption solution filled inside from flowing out of the cleaning bath or the desorption bath, a motor disposed on one side of the base plate, a drive shaft penetrating the base plate, with one end coupled to the motor and the other end coupled to the reaction housing to rotate the reaction housing, a plurality of linear actuators disposed on one side of the base plate for moving the motor vertically, and an outer frame extending from one side of the base plate that can be coupled with a chain of the moving means.

Further, the driving unit may vertically move the reaction housing downward to be immersed in the lithium solution tank or the desorption bath and rotates in one direction or the other direction to accelerate adsorption or desorption of lithium for the lithium adsorbent fixed to the reaction housing, and the driving unit vertically moves the reaction housing upwards and rotates at a predetermined speed in one direction or the other direction to discharge all the lithium-containing solution or desorption solution remaining inside the pores inside the lithium adsorbent to the outside of the lithium adsorbent.

Further, the reaction housing may include, a housing frame connected to a drive shaft on one side, a support shelf coupled to the housing frame for supporting and fixing the lithium adsorbent, and a housing mesh surrounding the outer peripheral surface of the frame and is formed of a corrosion-resistant material through which a lithium-containing solution, a cleaning solution or a desorption solution passes.

Further, a sliding door or a door fixed by a hinge may be provided on one side of the housing frame so that one side is open and the lithium adsorbent can be loaded into the support shelf.

Further the lithium adsorbent may be formed by attaching delithiated manganese oxide to a porous carrier to adsorb lithium in the lithium-containing solution and desorb lithium in an acidic aqueous solution, and the lithium adsorbent is formed in a block form so as to be fixed to the reaction housing.

Further, an edge portion may be disposed along one surface along the outer circumference of the lithium supply portion and the reaction portion, and a safety rail is provided at an upper portion of the edge portion.

Further a work table may be disposed in the reaction portion, and the table is mounted to a rail provided at an edge of the reaction portion to be movable inside the reaction portion.

According to another aspect of the present invention, the present invention provides a lithium adsorption desorption method using a lithium adsorption desorption apparatus, and the lithium adsorption desorption method using the lithium adsorption desorption apparatus includes:

(a) preparing a lithium adsorbent and mounting it on a reaction housing;

(b) immersing the reaction housing in a lithium solution tank and rotating the reaction housing to accelerate lithium adsorption;

(c) lifting the lithium adsorbent adsorbed with lithium together with the reaction housing to immerse in a cleaning bath filled with a cleaning solution and rotating the reaction housing to wash the lithium adsorbent;

(d) immersing the washed lithium adsorbent in a desorption bath filled with a desorption solution and rotating the reaction housing to desorb lithium:

(e) lifting the lithium desorbed lithium adsorbent and rotating the same to remove residual desorption solution by centrifugal force; and (f) recovering the desorption solution which contains lithium for separation and storage.

Further, the method may further include, after said step (e), confirming whether the lithium adsorbent is damaged or contaminated, and replacing the lithium adsorbent in the reaction housing if the lithium adsorbent is damaged or contaminated, or returning to said step (b) for re-adsorbing lithium.

The lithium adsorption-desorption apparatus of the present invention fixes a large amount of lithium adsorbent and immerses it in a lithium-containing solution to effectively adsorb lithium and then removes the lithium-containing solution, and after effectively removing contaminants and other metals in a cleaning bath, continuously immerses the lithium adsorbent in a desorption solution to desorb lithium and separates and recovers the desorption solution and stores the desorption solution containing a high concentration of lithium by a quick and efficient process which can greatly improve lithium recovery efficiency.

Moreover, after the process of adsorbing lithium on a lithium adsorbent, the process of washing the lithium adsorbent, and the process of immersing the lithium adsorbent in a desorption solution to desorb the lithium, the solution remaining in the lithium adsorbent is quickly and effectively removed, thereby improving the efficiency of the process.

Further, in order to more effectively adsorb and desorb lithium in the lithium adsorbent formed of the porous carrier, the lithium adsorption-desorption apparatus is configured to have a reactor filled with a lithium-containing solution or a desorption solution disposed adjacent to each other to so that the lithium desorption process is performed subsequently to the lithium adsorption process, thereby significantly improving the lithium recovery efficiency.

Further, since the lithium adsorbent uses a porous carrier, it is impossible to adsorb lithium to or desorb lithium from the deeper parts of the pores only by immersing in a lithium-containing solution or a desorption solution, but by a process of rotating the lithium adsorbent when the lithium adsorbent is in an immersed state so that a vortex and aeration is formed, the lithium-containing solution or the desorption solution can permeate into the deeper parts of the pores, thereby it is possible to improve lithium adsorption-desorption efficiency.

Further, the cleaning process and the desorption process are continuously performed by alternately arranging the cleaning bath and the desorption bath, and by arranging a plurality of desorption baths, the concentrated desorption solution can be separated and stored to effectively collect lithium.

Further, since it is possible to fill a lithium adsorbent prepared in a predetermined form in a standardized case, which can be used to continuously perform adsorption of lithium, desorption of lithium, and a cleaning process of the lithium adsorbent in large amounts, not only is the overall lithium adsorption-desorption process improved, but the amount of lithium produced also increases greatly, and the workload of workers can be significantly decreased because the workers do not need to mount or separate and transfer the lithium adsorbent themselves.

It is to be understood that the effects of the present invention are not limited to the above effects, but include all effects that can be derived from the structure of the present invention described in the detailed description of the invention or the scope of the invention.

BRIEF DESCRIPTION OF THE DRAWINGS

FIG. 5 is a process flow chart of a lithium adsorption-desorption method using a lithium adsorption-desorption apparatus according to another aspect of the present invention.

DETAILED DESCRIPTION OF THE INVENTION

Figure 1:
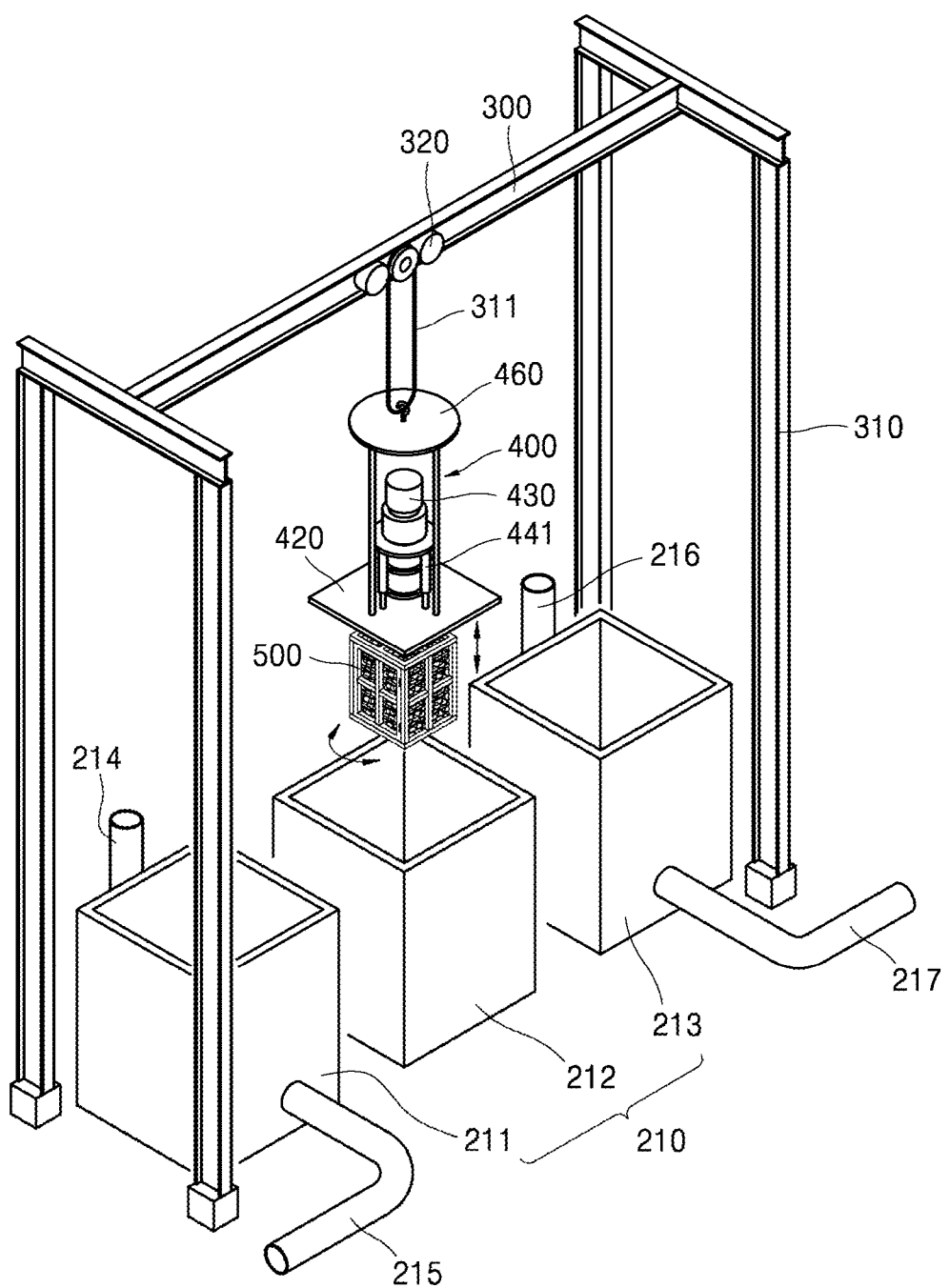
FIG. 1 is a perspective view of a lithium adsorption-desorption apparatus according to an embodiment of the present invention.

Hereinafter, preferred embodiments of the present invention will be described in detail with reference to the accompanying drawings.

Advantages, features, and methods of accomplishing the present invention can be clearly understood by referring to the drawings and the embodiments described hereinafter.

However, the present invention is not limited to the embodiments disclosed below, but can be implemented in various forms that are different from each other, and the present embodiment merely completes the disclosure of the present invention, and is intended to fully inform the scope of the invention to persons skilled in the art to which the present invention belongs, and the invention is only defined by the scope of the claimed invention.

Further, when describing the present invention, if it is judged that the detailed description of a related known function or structure may unnecessarily obscure the gist of the present invention, the detailed description thereof will be omitted.

The present inventors have found that when a porous lithium adsorbent is prepared in a predetermined form, the amount of lithium adsorption is increased due to an increase in surface area, but when these are immersed in large amounts in a lithium-containing solution, since the lithium does not permeate into the deeper parts of the pores, there is a problem that the lithium adsorption rate is low, and it is difficult to effectively treat the solution and foreign matter remaining in the porous body. The present inventors have found that by molding the lithium adsorbent in a block shape and fixing it to a reaction housing, and rotating it at a predetermined speed or higher in a state where the reaction housing is immersed in a lithium-containing solution, cleaning solution or desorption solution, the permeation of the solution into the porous body increased greatly due to an aeration effect, and if the lithium adsorbent is lifted again and rotated at a predetermined speed or higher, it was found that all of the residual solution can be discharged by centrifugal force, and so the present invention was completed.

FIG. 1 is a perspective view of a lithium adsorption-desorption apparatus according to an embodiment of the present invention.

Referring to FIG. 1, a lithium adsorption-desorption apparatus includes reaction tanks 210, a guide rail 300, a driving unit 400, and a reaction housing 500.

The reaction tanks 210 are arranged in a line such that the driving unit 400 can be moved along the guide rail 300 on the upper side of the reaction tank 210 to be accurately positioned at an upper portion of the reaction tank 210.

The reaction tanks 210 can be arranged such that a lithium-containing bath 211 filled with a lithium-containing solution, a washing bath 212 filled with a washing solution, and a desorption bath 213 filled with a lithium desorption solution are alternately arranged.

The lithium-containing bath 211 may be provided with an inflow port 214 on one side for the lithium-containing solution to flow in and an outflow port 215 for the lithium-containing solution to flow out after the lithium adsorption reaction.

The desorption bath 213 may be provided with an inflow port 216 for the desorption solution to flow in, and an outflow port 217 for the desorption solution with lithium concentrated by desorbed lithium to flow out.

Similarly to the lithium-containing bath and the desorption bath, the cleaning bath 212 is provided with an inflow port on one side and an outflow port on the other side, so that the cleaning solution can be continuously supplied and circulated, and metals and contaminants other than lithium adsorbed to the lithium adsorbent 540 can be separated and discharged.

When the lithium-containing bath 211, the cleaning bath 212, and the desorption bath 213 are alternately arranged in a row, the driving unit 400 can move along each of the lithium-containing bath 211, the desorption bath 212, or the washing bath 213. When the reaction housing 500 is accurately positioned at an upper side of the lithium-containing bath 211, the desorption bath 212, or the washing bath 213, the process of lowering and immersing the reaction housing 500 to adsorb or desorb lithium or effectively clean the lithium adsorbent 540 can be performed quickly and effectively.

The guide rail 300 is disposed at an upper portion of the reaction tank 210.

The guide rail 300 can be arranged to move the driving unit 400.

The driving unit 400 is movable by being coupled to a moving means 320 that moves along the guide rail 300.

Specifically, the moving means 320 may preferably be a hoist.

The driving unit 400 moves in conjunction with the moving means 320 so as to be movable at the upper portion of the reaction tanks 210 along the exact position of the reaction tanks 210.

The driving unit 400 includes a chain 311, a base plate 420, a actuator 441, and a drive shaft 450.

One end of the chain 311 is coupled to the driving unit 400, and the other end is coupled to the pulley of the moving means 320 for vertically moving the driving unit 400.

Since the base plate 420 is coupled to the moving means 320 via the chain 311, the entire driving unit 400 is movable in the vertical direction and can be linearly moved along the guide rail 300.

The base plate 420 may be coupled to the chain 311 to be movable in the vertical direction and may be provided with a motor 430.

The driving unit 400 can be lowered vertically to immerse the reaction housing 500 in the lithium-containing solution, the desorption solution, or the cleaning solution inside the reaction tanks 210.

The motor 430 can rotate the reaction housing 500 in one direction or the other.

Therefore, the driving unit 400 is vertically moved or rotated in a state in which the reaction housing 500 to which the lithium adsorbent 540 is fixed is attached, and enables the lithium-containing solution, the desorption solution or the cleaning solution to permeate more effectively into the lithium adsorbent 540.

The driving unit 400 can lift the reaction housing 500 from the reaction tanks 210 and rotate the same to discharge all the lithium-containing solution, the cleaning solution or the desorption solution remaining in the deeper parts of the pores.

The actuator 441 is provided on one side of the base plate 420 and moves the motor 430 vertically.

The actuator 441 may move the reaction housing 500 in the vertical direction in a state where the driving unit 400 is placed on a reaction tank 210, such that the aeration and agitation effect by the rotation of the reaction housing 500 can be further improved.

The drive shaft 450 may be coupled with the motor 430 to rotate the reaction housing 500.

The drive shaft 450 transmits the rotational force of the motor 430 to the reaction housing 500 to rotate the reaction housing 500 in one direction or the other direction, thereby accelerating the adsorption of lithium and the desorption of lithium.

Further, the reaction housing 500 is rotated at a predetermined speed or higher by receiving the rotational force of the motor 430, and can discharge all of the lithium-containing solution, the cleaning solution, or the desorption solution remaining in the lithium adsorbent 540 fixed inside the reaction housing 500.

Figure 2:
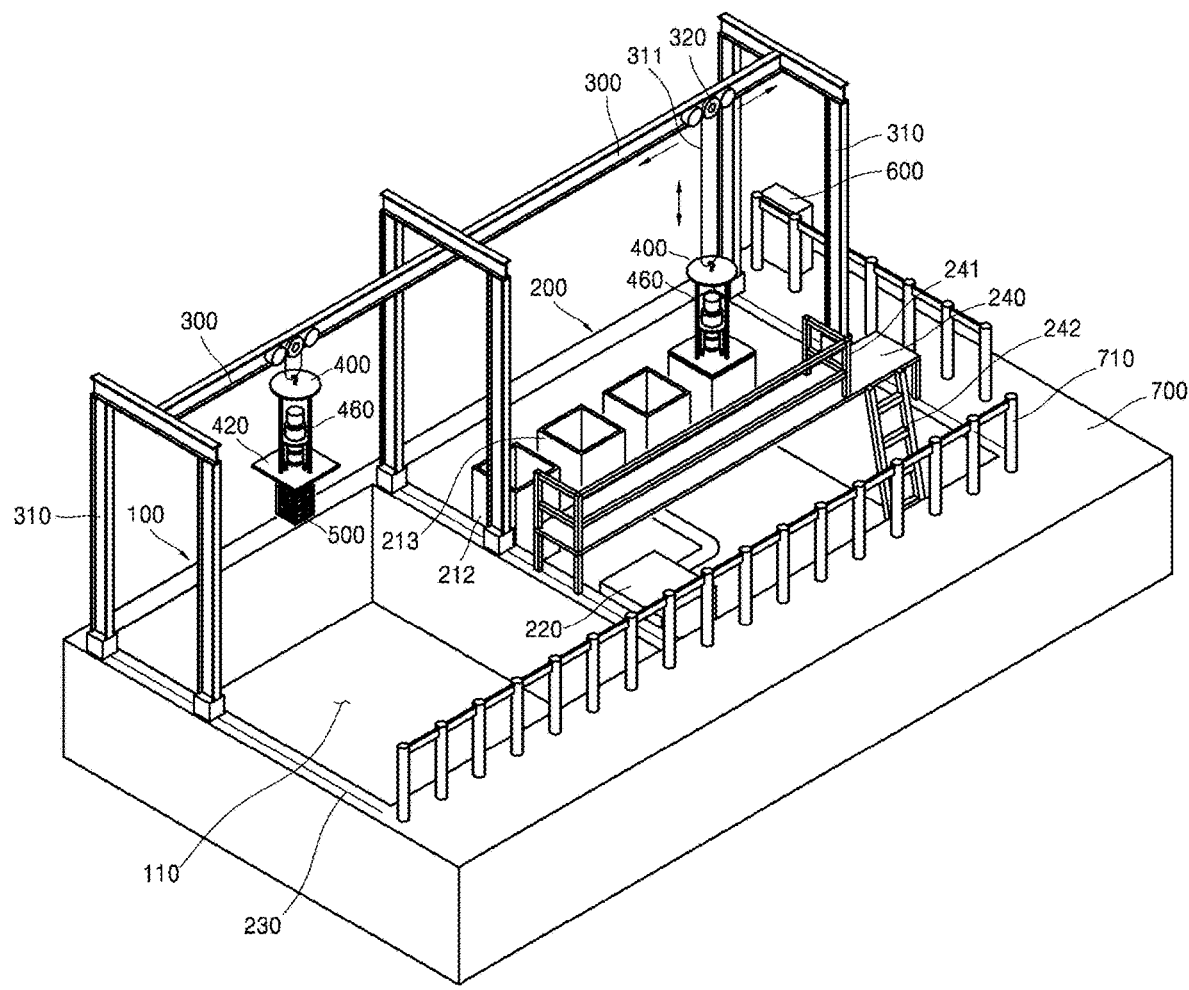
FIG. 2 is a perspective view of a lithium adsorption-desorption apparatus according to another embodiment of the present invention.
Figure 3:
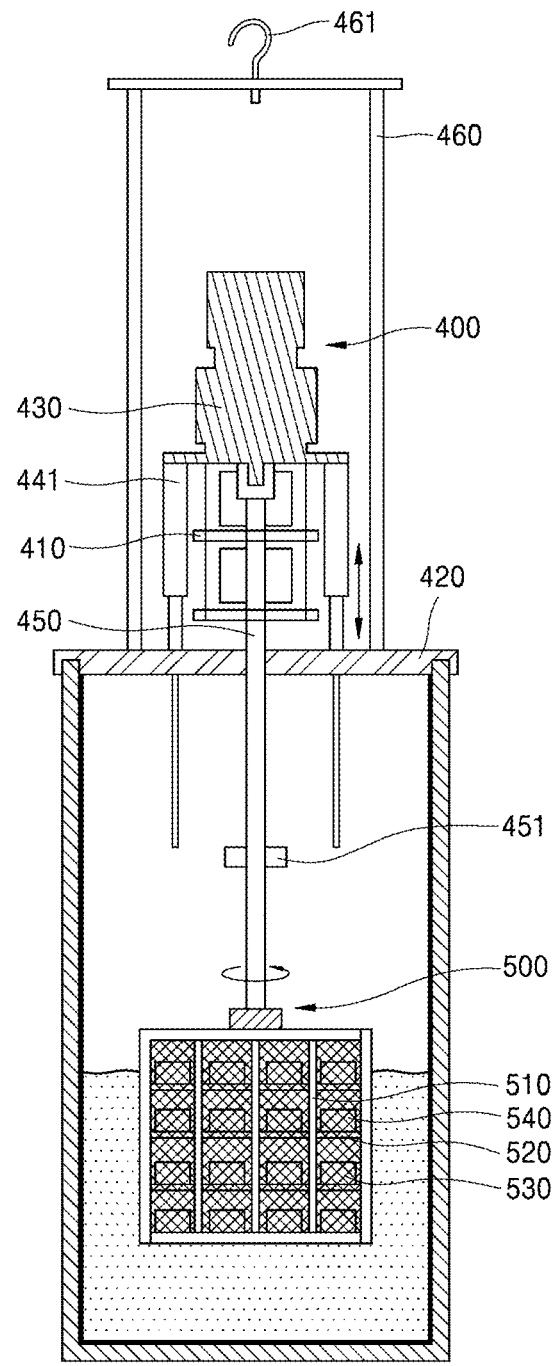
FIG. 3 is a side sectional view of a driving unit of the lithium adsorption-desorption apparatus of FIG. 2.
Figure 4:
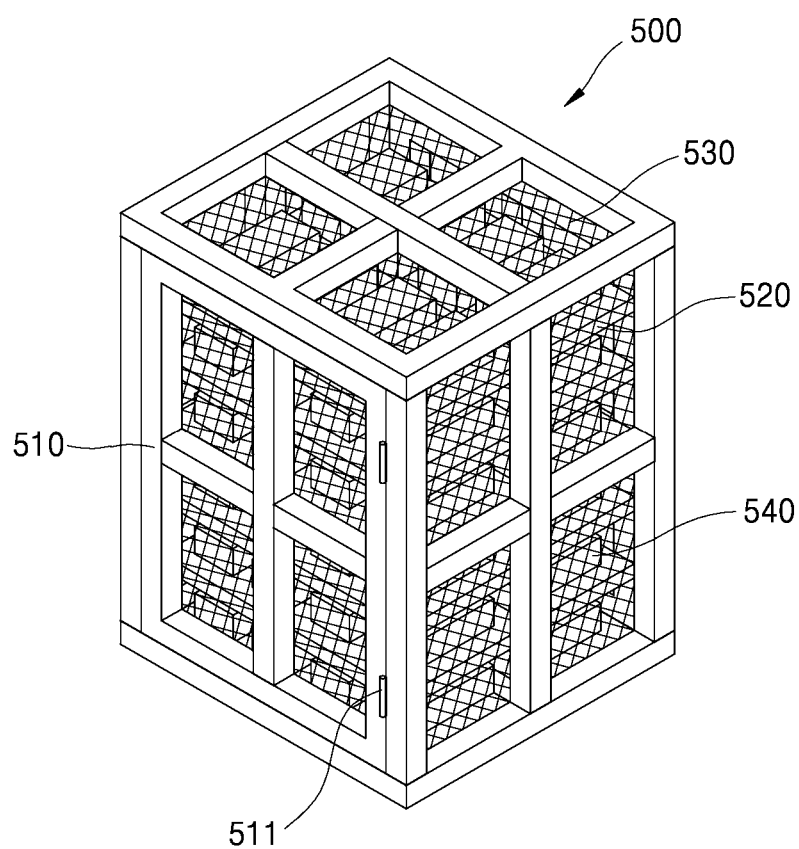
FIG. 4 is a perspective view of a reaction housing of the lithium adsorption-desorption apparatus of FIG. 2.

FIG. 2 is a perspective view of a lithium adsorption-desorption apparatus according to another embodiment of the present invention, FIG. 3 is a side sectional view of a driving unit of the lithium adsorption-desorption apparatus of FIG. 2, and FIG. 4 is a perspective view of a reaction housing of the lithium adsorption-desorption apparatus of FIG. 2.

Referring to FIG. 2, a lithium adsorption-desorption apparatus according to another embodiment of the present invention includes a lithium supply portion 100, a reaction portion 200, a guide rail 300, a driving unit 400, a reaction housing 500, and a control unit 600.

A lithium solution tank 110 filled with lithium is disposed inside the lithium supply portion 100.

The lithium supply portion 100 provides a space for disposing the lithium solution tank 110 filled with the lithium-containing solution.

The lithium supply portion 100 may be separated from the reaction portion 200, and a lithium-containing solution can be supplied in a large amount.

A plurality of inflow pipes (not shown) and outflow pipes (not shown) may be provided on a side of the lithium supply portion 100 for a lithium-containing solution to flow in and out, respectively.

In the case where the inflow pipes and outflow pipes are provided, the lithium-containing solution can be supplied and lithium can be recovered continuously.

The lithium-containing solution may be one selected from the group consisting of seawater, brine, geothermal water, and lithium waste solution and the like.

Preferably, the lithium supply unit 100 may be provided with a lithium solution tank 110 filled with a lithium-containing solution, but it is also possible to supply a lithium-containing solution disposed and produced near a beach, a lakeside, near a geothermal power plant, a lithium ion battery processing plant, or the like directly to the reaction portion 200.

In the case where the lithium-containing solution is seawater or brine, it is preferable that the lithium solution tank 110 is separated from the reaction portion 200 and is provided having a large size.

The lithium solution tank 110 may be provided according to the type of the lithium-containing solution. In one embodiment, when consisting of a lithium waste solution, epoxy or a polyvinyl chloride (PVC) coating layer is formed on the inner surface to have acid resistance and corrosion resistance.

The lithium solution tank 110 can be provided in a plurality of separate units in the lithium supply portion 100. In this case, there is an advantage that lithium can be recovered from a plurality of lithium supply sources.

The reaction portion 200 is disposed on one side of the lithium supply portion 100, and is provided with a plurality of cleaning baths 212 and desorption baths 213 therein.

The reaction portion 200 is disposed on one side of the lithium supply portion 100, and the lithium desorption process can be subsequently performed after the lithium adsorption process.

The cleaning bath 212 and the desorption bath 213 are filled with a cleaning solution and a desorption solution, respectively, and the cleaning bath 212 and the desorption bath 213 can be alternately arranged in a row.

The cleaning bath 212 is filled with a cleaning solution capable of rinsing the lithium adsorbent 540, and the desorption bath 213 is filled with a desorption solution capable of desorbing lithium from the lithium adsorbent 540, such as an acidic aqueous solution.

The cleaning bath 212 and the desorption bath 213 are arranged in a row so that the moving distance of the driving unit 400 can be minimized and moved efficiently. The driving unit 400 moves a minimal distance along the guiderail disposed spaced apart from the upper portion of the cleaning bath 212 and the desorption bath 213 to lower the reaction housing 500 in the vertical direction to immerse the lithium adsorbent 540.

The cleaning bath 212 is filled with a cleaning solution such as fresh water in addition to the lithium adsorbent 540 with lithium adsorbed thereto and the purity of the lithium to be recovered can be greatly increased by rinsing off and discharging contaminants and metals other than the lithium of the lithium adsorbent 540.

The cleaning bath 212 may further include a filtering device (not shown) for recovering and circulating the cleaning solution on one side, and in this case, environmental hazards may be reduced.

The desorption tank 213 is provided with a lithium concentration tank 220 on one side thereof, and the lithium concentration tank 220 is configured to receive and store a desorption solution in which lithium is desorbed and concentrated.

In the desorption bath 213, the lithium desorbed from the lithium adsorbent 540 by the reaction between the lithium adsorbent 540 and the desorption solution is concentrated in the desorption solution, and when the lithium adsorbent 540 is repeatedly desorbed, the concentration of lithium in the desorption solution gradually increases.

When the lithium concentration in the desorption solution is concentrated to a predetermined level or more, the desorption solution may be transferred to the lithium concentration tank 220 for storage.

The desorption solution stored in the lithium concentration tank 220 contains lithium at a high concentration, so lithium can be recovered more efficiently from the desorption solution.

The guide rail 300 is placed on a plurality of frames 310 extending from the edges of the lithium supply portion 100 and the reaction portion 200.

The plurality of frames 310 extend from the edges of the lithium supply portion 100 and the reaction portion 200.

The guide rail 300 can enable the driving unit 400 to move in a horizontal direction.

The frame 310 extends from the edge of the lithium supply portion 100 and the reaction portion 200, and the guide rail 300 is fixed to the frame 310 and the guide rail 300 may be disposed to be spaced apart from an upper portion of the lithium supply portion 100 and the reaction portion 200.

The guide rail 300 is disposed to be spaced apart from an upper portion of the lithium supply portion 100 and the reaction portion 200, so that the driving unit 400 coupled with the moving means 320 can be accurately positioned in the upper portion of the lithium solution tank 110, the cleaning bath 212, or the desorption bath 213.

When the driving unit 400 moving along the guide rail 300 is accurately located at the upper portion of the lithium solution tank 110, the cleaning bath 212 or the desorption bath 213, the driving unit 400 may be lowered towards the lithium solution tank 110, the cleaning bath 112 or the desorption bath 213 via the moving means 320.

FIG. 3 is a side sectional view of the driving unit of the lithium adsorption-desorption apparatus of FIG. 2.

Referring to FIG. 3, the driving unit 400 is coupled to a moving means 320 that is movable along the guide rail 300.

The driving unit 400 is coupled to the moving means 320 moving along the guide rail 300, so that the driving unit 400 can be moved towards the upper portion of the lithium solution tank 110, the cleaning bath 212 or the desorption bath 213, and according to the operation of the moving means 320, can be lowered towards the lithium solution tank 110, cleaning bath 212 or the desorption bath 213.

The moving means 320 is a member movable along the guide rail 300, and the moving means 320 is not limited thereto as long as it can move along the guide rail 300 and move the driving unit 400 in a vertical direction.

In accordance with the rotation of a pulley of the moving means 320, the driving unit 400 is lowered and may be coupled to the upper portion of the lithium solution tank 110, the cleaning bath 212, or the desorption bath 213.

The driving unit 400 includes a base plate 420, a motor 430, a drive shaft 450, a linear actuator 441, and an outer frame 460.

The base plate 420 may be mounted to the upper portion of the cleaning bath 212 and the desorption bath 213.

The form of the base plate 420 is configured to correspond to the form of the outer circumference of the cleaning bath 212 and the desorption bath 213 and is lowered and coupled to the upper portion of the cleaning bath 212 and the desorption bath 213 in accordance with the operation of the moving means 320, to seal the cleaning bath 212 and the desorption bath 213. Therefore, even when the reaction housing 500 rotates strongly in accordance with the operation of the driving unit 400, the cleaning solution or the desorption solution filled inside is prevented from spilling out of the cleaning bath 212 and the desorption bath 213.

The motor 430, the drive shaft 450, the linear actuator 441, and the outer frame 460 may be disposed and fixed to the base plate 420.

The motor 430 is disposed on one side of the base plate 420.

The motor 430 provides the driving force for rotating the reaction housing 500.

A shaft bearing 410 for supporting the drive shaft 450 coupled to the motor 430 to rotate is provided on the lower side of the motor 430.

The drive shaft 450 penetrates the bottom plate 420, and one end thereof is coupled to the motor 430, and the opposite end is coupled to the reaction housing 500 to rotate the reaction housing 500 by a rotational force transmitted from the motor 430.

The drive shaft 450 may be provided with a shaft coupling device 451 that can separate or recouple the shaft with the motor 430.

Preferably, the shaft coupling device 451 is connected via a nipple or coupled via a stud bolt.

In the case where a shaft coupling device 451 is provided, it is easy to completely separate the reaction housing 500 from the driving unit 400 to withdraw the lithium adsorbent 540 or clean the reaction housing 500.

The linear actuator 441 is disposed on one side of the base plate 420 for moving the motor 430 in a vertical direction.

By the operation of the linear actuator 441, the reaction housing 500 can be completely immersed in the cleaning solution or the desorption solution inside the reaction tank 210 or lifted from the desorption solution or the cleaning solution.

In this case, the inside of the cleaning bath 212 and the desorption bath 213 are filled with a desorption solution or a cleaning solution to a predetermined water level, and a hollow space is formed in a part inside, so when the reaction housing 500 is lifted, it can be completely separated from the desorption solution or the cleaning solution.

When the linear actuator 441 moves the motor 430 downward in the vertical direction, the reaction housing 500 is immersed in the desorption solution or the cleaning solution, and as the motor 430 rotates, the desorption solution or the cleaning solution flows into the reaction housing 500.

In this case, when the rotation of the reaction housing 500 is accelerated to rotate at a predetermined speed or higher, the reaction housing 500 and the cleaning solution or the desorption solution are mutually rubbed to generate an aeration effect, and A vortex is formed inside the cleaning bath 212 and the desorption bath 213, so that the cleaning solution or the desorption solution can be applied to the deeper parts of the pores inside the lithium adsorbent 540. Thereby, it is possible to accelerate the desorption of lithium or effectively wash the pores inside of the lithium adsorbent 540.

When the rotation of the motor 430 is reversed, the reaction housing 500 is rotated from one direction to the opposite direction, and in this case, the aeration effect can be increased.

The rotational speed of the reaction housing 500 is determined experimentally.

Therefore, the driving unit 400 vertically moves the reaction housing 500 downward to be immersed in the lithium solution tank 110 or a reaction tank 210, and rotates in one direction or the other direction to accelerate lithium adsorption or desorption of the lithium adsorbent 540 fixed to the reaction housing 500.

Meanwhile, when the linear actuator 441 moves the motor 430 upwards in the vertical direction, the reaction housing 500 floats up and is lifted from the desorption solution or the cleaning solution.

In the case where the reaction housing 500 is lifted, the cleaning solution or the desorption solution may be discharged by gravity from the pores inside the lithium adsorbent 540 fixed to the reaction housing 500, but the desorption solution or the cleaning solution remains in the fine pores.

In accordance with the rotational movement of the motor 430, the reaction housing 500 rotates together therewith, and the the cleaning solution or the desorption solution remaining in the internal pores of the lithium adsorbent 540 fixed inside can be completely removed by centrifugal force.

When the desorption liquid is completely removed from the lithium adsorbent 540, the lithium adsorption efficiency can be increased. When the cleaning solution is completely removed, the lithium adsorbent 540 is prevented from being contaminated, and other metals other than lithium are prevented from remaining in the lithium adsorbent 540 such that when lithium is recovered, the purity of lithium can be significantly increased.

Therefore, the driving unit 400 vertically moves the reaction housing 500 from the inside of the cleaning bath 212 or the desorption bath 213 to the upper portion, and rotates the reaction housing 500 at a predetermined speed in one direction or the other direction to enable complete removal of the cleaning solution or desorption solution remaining in the internal pores of the lithium adsorbent 540.

Since the plurality of cleaning baths 212 and the desorption baths 213 are arranged in a row inside the reaction unit 200, the movement of the driving unit 400 can be minimized, which is very effective, and one driving unit 400 can be used to perform rinsing and desorption in the plurality of cleaning baths 212 and desorption baths 213, which is very efficient.

Meanwhile, the driving unit 400 may be located along the guide rail 300 to be spaced apart from the upper side of the lithium supply portion 100.

When the driving unit 400 moves along the guide rail 300 and is accurately positioned on an upper portion of the lithium solution tank 110 of the lithium supply portion 100, the base plate 420 is lowered in the same manner and immersed in the lithium solution tank 110, and the reaction housing 500 is immersed in the lithium-containing solution inside the lithium solution tank 110 and is rotated at a predetermined speed or higher to accelerate the adsorption of lithium.

When lithium is adsorbed to the lithium adsorbent 540, the lithium adsorbent 540 can be lifted, and the driving unit 400 can be positioned above the cleaning bath 212 along the guide rail 300, and the reaction housing 500 can be lowered to wash the lithium.

The outer frame 460 is extended from one side of the base plate 420 and enables the coupling to a chain 311 of the moving means 320.

The outer frame 460 is provided with a fixing ring 461 at one end, and the fixing ring 461 is connected to the moving means 320 via the chain 311.

The base plate 420 is coupled to the moving means 320, so that the base plate 420 can be stably moved even when the moving means 320 moves.

FIG. 4 is a perspective view of a reaction housing 500 of the lithium adsorption-desorption apparatus of FIG. 2.

Referring to FIG. 4, the reaction housing 500 includes a housing frame 510, a support shelf 520, and a housing mesh 530 formed of a corrosion-resistant material.

Referring to FIG. 4, the reaction housing 500 is introduced into the lithium solution tank 110 or the cleaning bath 212 or the desorption bath 213 in a state where a lithium adsorbent 540 manufactured in a fixing block form is fixed thereto, thereby fixing the lithium lithium adsorbent 540 during the reaction caused by contact with the lithium-containing solution, cleaning solution or the desorption solution.

The lithium adsorbent 540 can be standardized to be manufactured in a block form at the time of molding.

The lithium adsorbent 540 may be an ion sieve type manganese oxide formed by applying a lithium manganese oxide to a porous carrier formed of a high alumina or an anti-oxidation ceramic material and performing acid treatment for the topotactic extraction of lithium ions.

Preferably, the manganese oxide is an ion sieve type manganese oxide having a spinel structure, particularly a manganese oxide having a spinel structure having a three-dimensional (1×3) tunnel structure. Preferably, the manganese oxide is a manganese oxide represented by the chemical formula $H_nMn_{2-x}O_4$ (wherein $1 \leq n \leq 1.33$, $0 \leq x \leq 0.33$, $n \leq 1+x$) and preferably, $H_{1.33}Mn_{1.67}O_4$, but is not limited thereto.

Modified manganese oxides such as $H_{1.6}Mn_{1.6}O_4$ and $H_{1.6}(Mn_x\text{-}M_{y,\ x+y=1})_{1.6}O_4$ (M; other elements of transition metal or replaceable manganese) with further improved performance can also be used in an embodiment of the present invention.

Preferably, the lithium adsorbent 540 has a block form, but is not limited thereto as long as it is fixed to the reaction housing 500.

In the case where the above lithium adsorbent 540 is prepared in a block form, it can be very easily fixed in the reaction housing 500.

Manganese oxide is uniformly applied to the porous carrier of the lithium adsorbent 540 to be attached even in the deeper parts of the pores, and the lithium-containing solution is brought into contact with the pores to adsorb lithium, and the desorption solution is used again to recover lithium, and when lithium is desorbed, it is regenerated into a lithium adsorbent 540.

Therefore, it is difficult to have the lithium-containing solution, the desorption solution or the cleaning solution to permeate even the deep parts inside the pores of the lithium adsorbent 540. However, in the case where these solutions permeate the inner parts of the pores, the efficiency of the lithium recovery process can be remarkably increased.

The reaction housing 500 includes a housing frame 510, a support shelf 520, and a housing mesh 530.

Preferably, the reaction housing 500 is treated with a corrosion-resistant substance such as an epoxy resin to minimize corrosion by seawater or an acidic aqueous solution.

The housing frame 510 is coupled to the drive shaft 450 on one side.

The housing frame 510 is coupled to the drive shaft 450 to rotate together in accordance with the rotation of the drive shaft 450, and the reaction housing 500 also rotates.

The support shelf 520 is coupled to the housing frame 510 to support and fix the lithium adsorbent 540.

The housing frame 510 may be provided to provide a structure for placing the support shelf 520.

The support shelf 520 strongly fixes the lithium adsorbent 540 while the lithium adsorbent 540 is in contact with the lithium-containing solution, the desorption solution, or the cleaning solution to perform lithium adsorption-desorption and rinsing, respectively.

In order to fix the lithium adsorbent 540, the support frame 520 is provided with a guide piece (not shown) or a structure in which the lithium adsorbent 540 can be inserted and fixed, so that even if the lithium adsorbent 540 is rotated or the lithium adsorbent 540 is very strongly permeated with a lithium solution, a desorption solution or a cleaning solution, the lithium adsorbent 540 can be prevented from being separated or detached from the support shelf 520.

On one side of the housing frame 510, a sliding door (not shown) or a door fixed by a hinge 511 is provided. Since one side is open, the lithium adsorbent 540 can be easily loaded to the support shelf 520.

In a case where the door is provided to allow the reaction housing 500 to be opened, even if the lithium adsorbent 540 is contaminated or damaged, it is possible to replace only a part.

The housing mesh 530 surrounds the outer peripheral surface of the housing frame 510, thereby preventing the lithium adsorbent 540 from being discharged to the outside of the reaction housing 500, and since the lithium-containing solution, the cleaning solution, and the desorption solution flows in and out freely, the adsorption and desorption of the lithium adsorbent 540 can be promoted.

The control unit 600 is disposed on one side of the reaction portion 200 to control the movement of the moving means 320 and the driving unit 400.

The control unit 600 controls the driving unit 400 to move via the moving means 320, and controls the rotation of the reaction housing 500 after the driving unit 400 is lowered and placed on the reaction tank 210, so all of the lithium adsorption-desorption process and the rinsing process of the lithium adsorbent 540 can be controlled.

An edge portion 700 is disposed along one surface of the outer circumference of the lithium supply portion 100 and the reaction portion 200, and a safety rail 710 is provided at an upper portion of the edge portion 700.

Since the lithium supply portion 100 is filled with a large amount of the lithium-containing solution, and the desorption bath 212 is filled with a desorption solution composed of an acidic aqueous solution, the safety of the worker can be at risk, and the safety rail 710 prevents the lithium supply portion 100 and the reaction unit 200 from being inadvertently accessed, thereby ensuring the safety of the staff.

A rail 230 is provided on one side of the edge portion 700 to allow the frame 310 to be moved to be re-fixed, so the guide rail 300 placed on the frame 310 is moved together, and even if the number of the reaction tanks 210 is increased, the driving unit 400 is located at an upper portion of the reaction tanks 210.

A plurality of reaction tanks 210 are provided inside the reaction portion 200 and a work table 240 that is movable inside the reaction portion is disposed attached to a rail provided at an edge of reaction portion 200.

A plurality of reaction tanks 210 are provided in a row inside the reaction portion 200, and the number of the reaction tanks 210 can be increased by adding rows of reaction tanks 210.

As the number of reaction tank 210 increases, the work table 240 provides a space for a worker to confirm and inspect the reaction tanks 210, and the work table 240 is coupled to the rail to be movable, so that as the number of the reaction tanks 210 increases, the location of the work table 240 can be changed.

Similarly to the edge portion 700, the safety rail 241 is provided on the upper portion of the work table 240, so that the safety of the worker can be ensured, and a lifting ladder 242 is provided on one side, thereby improving work convenience.

According to another embodiment of the present invention, the present invention provides a lithium adsorption-desorption method using a lithium adsorption-desorption apparatus, and the method includes:

(a) preparing a lithium adsorbent and mounting it on a reaction housing;

(b) immersing the reaction housing in a lithium solution tank and rotating the reaction housing to accelerate lithium adsorption;

(c) lifting the lithium adsorbent adsorbed with lithium together with the reaction housing to immerse in a cleaning bath filled with a cleaning solution and rotating the reaction housing to wash the lithium adsorbent;

(d) immersing the washed lithium adsorbent in a desorption bath filled with a desorption solution and rotating the reaction housing to desorb lithium:

(e) lifting the lithium desorbed lithium adsorbent and rotating the same to remove residual desorption solution by centrifugal force; and (f) recovering the desorption solution which contains lithium for separation and storage.

FIG. 5 is a process flow chart illustrating the steps of a lithium adsorption-desorption method using a lithium adsorption-desorption apparatus according to another aspect of the present invention.

Referring to FIG. 5, first, a plurality of lithium adsorbents molded in a fixing block form are attached to a reaction housing provided with a support shelf in step S100.

The reaction housing is fixed with a lithium adsorbent to be immersed in a lithium-containing solution, a desorption solution or a cleaning solution, so that the lithium adsorbent can be fixed and supported during vigorous agitation.

The reaction housing is immersed in a lithium solution tank and rotated to accelerate the adsorption of lithium in step S200.

A large amount of lithium adsorbent is fixed to the reaction housing, and a lithium solution tank is filled with a lithium-containing solution. Therefore, the lithium adsorbent is brought into contact with the lithium-containing solution and reacted to adsorb lithium.

In this case, by rotating the reaction housing to generate a vortex in the lithium-containing tank and increasing the aeration effect, the lithium-containing solution permeates into the deep parts in the pores inside the lithium adsorbent, thereby allowing effective adsorption of lithium.

The lithium adsorbent adsorbed with lithium is lifted and the reaction housing is rotated again at a predetermined speed to remove all residual lithium-containing solution.

The lithium adsorbent having lithium adsorbed thereon is lifted together with the reaction housing, is immersed in a cleaning bath filled with a cleaning solution, and the reaction housing is rotated to wash the lithium adsorbent in step S300.

During the process of adsorbing lithium the reaction housing rotates, and during the process of rubbing with the lithium-containing solution, not only lithium but also contaminants and other metals are also attached to the lithium adsorbent, so through the washing process, all the contaminants and other metals can be removed to increase the purity of the recovered lithium.

In the same manner as the adsorption process of lithium, the washing process of the lithium adsorbent also causes the lithium adsorbent to be immersed in the cleaning solution and the lithium adsorbent is rotated to generate a vortex and aeration effect, thereby allowing the permeation of the cleaning solution into the deep parts of the pores of the lithium adsorbent to increase the washing effect and the lithium adsorbent is lifted and rotated at a predetermined speed to remove all residual cleaning solution.

The washed lithium adsorbent is immersed in a desorption bath filled with a desorption solution and the reaction housing is rotated to desorb lithium in step S400.

The washed lithium adsorbent is immersed in the same manner as the reaction housing in the desorption bath filled with the desorption solution, and is rotated in one direction or the other direction to generate a vortex and increase the aeration effect inside the desorption bath which accelerates the desorption of lithium.

The lithium-desorbed lithium adsorbent is lifted and rotated to remove the desorption solution remaining therein by centrifugal force in step S500.

It is difficult to completely remove the desorption solution remaining in the pores inside the lithium adsorbent by gravity alone, but the lithium adsorbent can be rotated to remove all residual desorption solution by centrifugal force.

The lithium-containing desorption solution is then recovered for separation and storage in step S600.

In the above step S400, lithium is desorbed, so lithium is concentrated in the desorption solution, and when lithium is concentrated to a predetermined concentration or higher, it can be recovered and stored in a lithium concentration tank.

When a desorption solution containing a high concentration of lithium is stored in the lithium concentration tank, the lithium recovery efficiency can be remarkably increased.

On the other hand, after step S500, the method may further include confirming whether the lithium adsorbent is damaged or contaminated, and replacing the lithium adsorbent in the reaction housing if the lithium adsorbent is damaged or contaminated or returning to the above step S200 for re-adsorbing lithium.

The lithium adsorbent washing step and the lithium desorption step are continuously performed, and the lithium adsorbent can be re-reacted with lithium after desorbing lithium, so the lithium adsorbent can be recovered and re-immersed in a lithium-containing solution to continuously adsorb lithium without if the lithium adsorbent is not damaged or contaminated.

Therefore, the lithium adsorption-desorption method using the lithium adsorption-desorption apparatus of the present invention prepares a lithium adsorbent in a predetermined form, and provides a reaction housing for fixing the lithium adsorbent, and by sequentially immersing the reaction housing in a lithium-containing solution, cleaning solution, and a desorption solution, the lithium adsorbent absorbs or desorbs lithium, and the lithium adsorbent washing process is performed very quickly and effectively, thereby it is possible to significantly increase the lithium recovery efficiency.

As described above, the lithium adsorption-desorption apparatus of the present invention and the lithium adsorption-desorption method using the same have been described, but it is obvious that various modifications can be made without departing from the scope of the invention.

Therefore, the scope of the invention should not be construed as being limited by the scope of the invention, which is defined by the scope of the appended claims.

That is, the embodiments described above are to be considered in all respects as illustrative and not restrictive. The scope of the present invention is defined by the scope of the invention, and it is intended that all changes and modifications derived from the equivalent concept be included within the scope of the present invention.

What is claimed is:

1. A lithium adsorption-desorption apparatus comprising,
   a plurality of reaction tanks arranged in a row;
   a guide rail disposed at an upper portion of the reaction tank;
   a movable driving unit coupled to a moving means that moves along the guide rail; and
   a reaction housing which is mounted to the driving unit, and can be vertically moved or rotated in a state in which a lithium adsorbent is fixed thereto, and after immersing in the reaction tank, accelerates adsorption or desorption of lithium, and after being lifted, discharges residual solution from the lithium adsorbent by rotation movement.

2. The apparatus of claim 1, wherein the driving unit comprises,
   a chain coupled to the moving means;
   a base plate which is connected to the chain to be vertically movable and is provided with a motor;
   an actuator which is disposed on one side of the base plate and vertically moves the motor; and
   a drive shaft which is coupled to the motor to rotate the reaction housing.

3. A lithium adsorption-desorption apparatus comprising,
   a lithium supply portion where a lithium solution tank filled with a lithium-containing solution is disposed;
   a reaction portion which is disposed on one side of the lithium supply portion, and is provided with a plurality of cleaning baths and desorption baths therein;
   a guide rail placed on a plurality of frames extending from an edge of the lithium supply portion and the reaction portion;
   a driving unit coupled to a moving means that is movable along the guide rail;
   a reaction housing which is mounted to the driving unit, and can be vertically moved or rotated in a state in which a lithium adsorbent is fixed, such that after being immersed in the lithium solution tank to adsorb lithium or after being immersed and agitated in the cleaning bath or desorption bath to wash the lithium adsorbent or desorb lithium, respectively, is lifted vertically to discharge residual solution from the lithium adsorbent by centrifugal force generated by the rotation; and a control unit disposed on one side of the reaction portion to control movement of the moving means and the driving unit.

4. The apparatus of claim 3, wherein the lithium-containing solution is one selected from the group consisting of seawater, brine, geothermal water, and lithium waste solution.

5. The apparatus of claim 3, wherein the plurality of cleaning baths and desorption baths are arranged such that the cleaning baths filled with cleaning solution and desorption baths filled with an acidic aqueous solution are alternately arranged in a row.

6. The apparatus of claim 5, wherein the desorption bath is provided with a lithium concentration tank on one side, which receives and stores a desorption solution concentrated by lithium desorption.

7. The apparatus of claim 3, wherein the guide rail is spaced apart from the upper portion of the lithium supply portion and the reaction portion so that the driving unit coupled to the moving means is located at an upper portion of the lithium solution tank, the cleaning bath, or the desorption bath.

8. The apparatus of claim 3, wherein the driving unit comprises,
- a base plate attached to the upper portion of the cleaning bath or the desorption bath to prevent the cleaning solution or the desorption solution filled inside from flowing out of the cleaning bath or the desorption bath,
- a motor disposed on one side of the base plate,
- a drive shaft penetrating the base plate, with one end coupled to the motor and the other end coupled to the reaction housing to rotate the reaction housing,
- a plurality of linear actuators disposed on one side of the base plate for moving the motor vertically, and
- an outer frame extending from one side of the base plate that can be coupled with a chain of the moving means.

9. The apparatus of claim 3, wherein the driving unit vertically moves the reaction housing downward to be immersed in the lithium solution tank or the desorption bath and rotates in one direction or the other direction to accelerate adsorption or desorption of lithium for the lithium adsorbent fixed to the reaction housing, and the driving unit vertically moves the reaction housing upwards and rotates at a predetermined speed in one direction or the other direction to discharge all the lithium-containing solution or desorption solution remaining inside the pores inside the lithium adsorbent to the outside of the lithium adsorbent.

10. The apparatus of claim 3, wherein the reaction housing comprises, a housing frame connected to a drive shaft on one side,
a support shelf coupled to the housing frame for supporting and fixing the lithium adsorbent, and
a housing mesh surrounding the outer peripheral surface of the frame and is formed of a corrosion-resistant material through which a lithium-containing solution, a cleaning solution or a desorption solution passes.

11. The apparatus of claim 10, wherein a sliding door or a door fixed by a hinge is provided on one side of the housing frame so that one side is open and the lithium adsorbent can be loaded into the support shelf.

12. The apparatus of claim 3, wherein the lithium adsorbent, is formed by attaching delithiated manganese oxide to a porous carrier to adsorb lithium in the lithium-containing solution and desorb lithium in an acidic aqueous solution, and
the lithium adsorbent is formed in a block form so as to be fixed to the reaction housing.

13. The apparatus of claim 3, wherein an edge portion is disposed along one surface along the outer circumference of the lithium supply portion and the reaction portion, and a safety rail is provided at an upper portion of the edge portion.

14. The apparatus of claim 3, wherein a work table is disposed in the reaction portion, and the table is mounted to a rail provided at an edge of the reaction portion to be movable inside the reaction portion.

15. A lithium adsorption-desorption method using a lithium adsorption-desorption apparatus, comprising,
(a) preparing a lithium adsorbent and mounting it on a reaction housing;
(b) immersing the reaction housing in a lithium solution tank and rotating the reaction housing to accelerate lithium adsorption;
(c) lifting the lithium adsorbent adsorbed with lithium together with the reaction housing to immerse in a cleaning bath filled with a cleaning solution and rotating the reaction housing to wash the lithium adsorbent;
(d) immersing the washed lithium adsorbent in a desorption bath filled with a desorption solution and rotating the reaction housing to desorb lithium:
(e) lifting the lithium desorbed lithium adsorbent and rotating the same to remove residual desorption solution by centrifugal force; and
(f) recovering the desorption solution which contains lithium for separation and storage.

16. The method of claim 15, further comprising,
after said step (e),
confirming whether the lithium adsorbent is damaged or contaminated, and replacing the lithium adsorbent in the reaction housing if the lithium adsorbent is damaged or contaminated, or
returning to said step (b) for re-adsorbing lithium.

* * * * *